(12) United States Patent
Koski et al.

(10) Patent No.: US 12,299,516 B2
(45) Date of Patent: May 13, 2025

(54) RFID TAG

(71) Applicant: Confidex Oy, Tampere (FI)

(72) Inventors: Eveliina Koski, Tampere (FI); Miika Pylvänäinen, Tampere (FI); Will Deng, Guangzhou (CN)

(73) Assignee: Confidex Oy, Tampere, FL (US)

( * ) Notice: Subject to any disclaimer, the term of this patent is extended or adjusted under 35 U.S.C. 154(b) by 0 days.

(21) Appl. No.: 17/910,172

(22) PCT Filed: Mar. 24, 2020

(86) PCT No.: PCT/CN2020/080797
§ 371 (c)(1),
(2) Date: Sep. 8, 2022

(87) PCT Pub. No.: WO2021/189228
PCT Pub. Date: Sep. 30, 2021

(65) Prior Publication Data
US 2023/0351140 A1    Nov. 2, 2023

(51) Int. Cl.
*G06K 19/077* (2006.01)
*G06K 19/07* (2006.01)

(52) U.S. Cl.
CPC ... *G06K 19/07771* (2013.01); *G06K 19/0723* (2013.01); *G06K 19/07773* (2013.01)

(58) Field of Classification Search
CPC ....... G06K 19/07749; G06K 19/07773; G06K 19/07771; G06K 19/0723; G06K 19/04;
(Continued)

(56) References Cited

U.S. PATENT DOCUMENTS

2006/0054710 A1* 3/2006 Forster ............... H01Q 1/52
343/745
2006/0290498 A1 12/2006 Rawlings et al.
(Continued)

FOREIGN PATENT DOCUMENTS

CN    1305623 A    7/2001
CN   101055627 A   10/2007
(Continued)

OTHER PUBLICATIONS

Genovesi, Low-Profile Three-Arm Folded Dipole Antenna for UHF Band RFID Tags Mountable on Metallic Objects (Year: 2010).*
Prothro, "The Effects of a Metal Ground Plane on RFID Tag Antennas†" (Year: 2006).*
(Continued)

*Primary Examiner* — Thien T Mai
(74) *Attorney, Agent, or Firm* — Leason Ellis LLP

(57) ABSTRACT

The present invention relates to an RFID tag (11) that has a front side and a back side. The RFID tag (11) comprises a printable surface (13), an antenna (2) and an integrated circuit on a chip (4) electrically connected to the antenna (2). The RFID tag comprises a dielectric substrate (1), a dielectric layer (7) and a ground plane (3) under the substrate (1). The substrate (1) has a first side and a second side. The substrate (1) comprises an antenna (2) on the first side of the substrate (1). The antenna (2) and the ground plane (3) are configured to overlap. The substrate (1) is folded over at least one edge (7a; 7b) of the dielectric layer (7) in such a manner that the ground plane (3) is configured to cover the antenna (2) on the back side of the RFID tag (11).

15 Claims, 5 Drawing Sheets

(58) Field of Classification Search
CPC .............. G06K 19/0779; G06K 19/083; G06K 19/07798; G06K 19/077; G06K 19/027; G06K 19/025; G06K 19/07758
See application file for complete search history.

(56) References Cited

U.S. PATENT DOCUMENTS

| | | |
|---|---|---|
| 2009/0051617 A1 | 2/2009 | Merilainen et al. |
| 2009/0085750 A1* | 4/2009 | Waldner .................. H01Q 9/28 340/572.7 |
| 2009/0096613 A1* | 4/2009 | Westrick .......... G06K 19/07749 340/572.7 |
| 2009/0160653 A1 | 6/2009 | Yeh et al. |
| 2017/0236050 A1* | 8/2017 | Allen .................. G06K 19/0702 235/492 |
| 2019/0244072 A1* | 8/2019 | Forster ............. G06K 19/07749 |

FOREIGN PATENT DOCUMENTS

| | | | |
|---|---|---|---|
| CN | 101460311 A | 6/2009 | |
| EP | 2309597 A1 | 4/2011 | |
| EP | 3189553 A1 | 7/2017 | |
| JP | 2008176240 A * | 7/2008 | ............. B31D 1/022 |
| WO | WO-2004093249 A1 * | 10/2004 | ....... G06K 19/07749 |
| WO | 2016059285 A1 | 4/2016 | |

OTHER PUBLICATIONS

Betancourt, "Bending and Folding Effect Study of Flexible Fully Printed and Late-Stage Codified Octagonal Chipless RFID Tags" (Year: 2016).*
International Search Report and Written Opinion in PCT Application No. PCT/CN2020/080797, dated Nov. 26, 2020 (9 pages).
Extended European Search Report EP Application No. 20927142.8-1205/4128046, mailed Nov. 22, 2023 (9 pages).

* cited by examiner

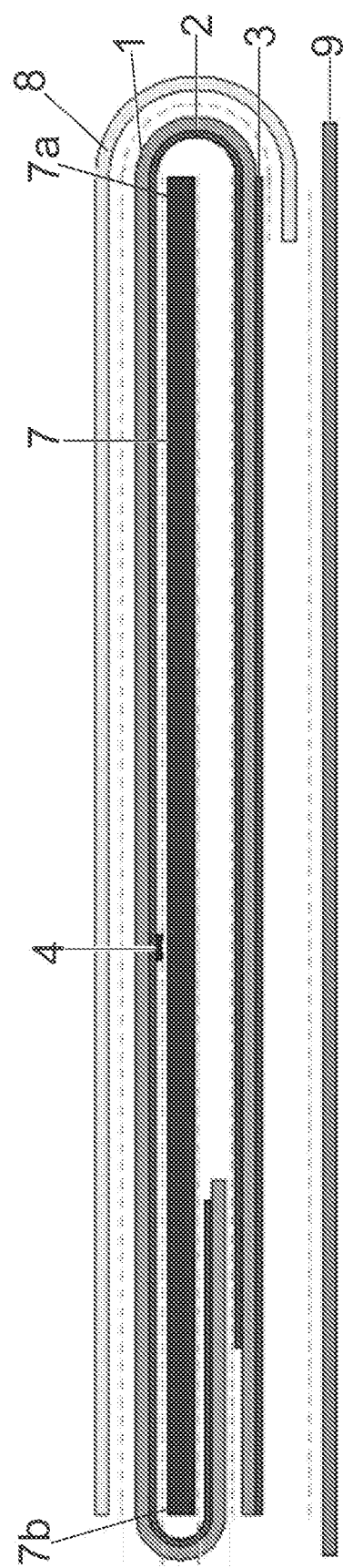
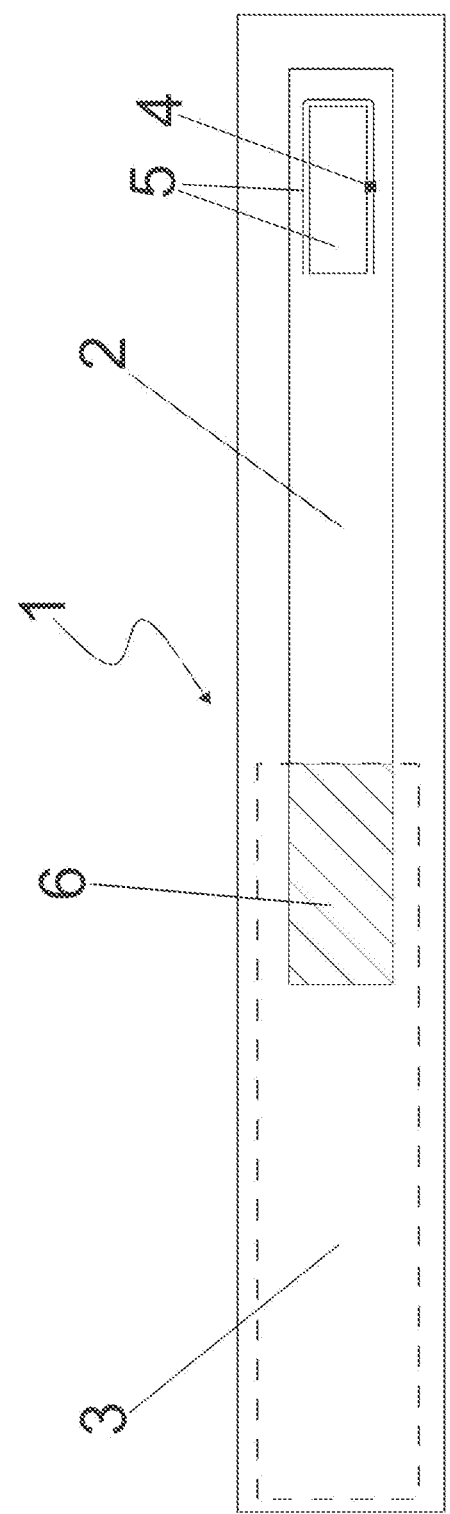
Fig. 4
Fig. 5

RFID TAG

CROSS-REFERENCE TO RELATED PATENT APPLICATIONS

This application is a U.S. National Phase Application under 35 U.S.C. § 371 of International Patent Application No. PCT/CN2020/080797, filed Mar. 24, 2020, which is incorporated by reference as if expressly set forth in its entirety herein.

FIELD OF THE INVENTION

The present invention relates to an RFID tag having a front side and a back side, the RFID tag comprising an antenna and an integrated circuit on a chip.

BACKGROUND OF THE INVENTION

One of the problems associated with the above tag is that it does not necessarily work on every surface. Another problem is that the tags cannot be encoded and printed simultaneously. Still another problem is that the antenna must be designed according to a need and it may be longer than desired.

BRIEF DESCRIPTION OF THE INVENTION

An object of the present invention to provide an RFID tag so as to solve the above problems. The objects of the invention are achieved by an RFID tag which is characterized by what is stated in the independent claim. The preferred embodiments of the invention are disclosed in the dependent claims.

An advantage of the RFID tag of the invention is that it works on every surface, i.e. it is not sensitive to the material to which it is attached. The same tag works on different dielectric surfaces such as water tanks, plastics, or coated metal. The back side of the tag works both as a shielding ground and as a part of the antenna. The tag has a narrower frequency band since a stabile radio frequency band can be obtained without increasing the band width.

The tag can be encoded and printed simultaneously. The antenna may be long but it does not make the tag larger.

The RFID tag is usually a flat structure that has a front side and a back side. The RFID tag may comprise several sheet-like layers on top of each other. The layers are described in this text as from the front side. The layers may be thin and flexible. The layer on the front side may have a printable surface. The printable surface means in this context that the surface can be printed by a printer-encoder that is designed for printing RFID tags and the print quality is sufficient e.g. for flawless barcodes. The printable surface may be a separate layer, such as a paper or plastic layer, or it may be a layer which already has a certain task in the structure and it has the printable surface as an excess feature, i.e. there is no separate layer for printing. However, the printable surface may be covered with a lacquer or a coating.

The tag may be a label. The label may be thin and conformable since it has to go through a printer-encoder. The label may have adhesive, such as pressure sensitive adhesive, on its back side.

The RFID tag comprises an antenna and an integrated circuit on a chip that is electrically connected to the antenna. The antenna may work at UHF frequencies between 850 MHz and 960 MHz.

The RFID tag (radio frequency identification tag) comprises a dielectric substrate, a dielectric layer and a ground plane under the dielectric substrate. In other words, the ground plane is on the underside of the substrate, or it is located on its own ground plane substrate under the dielectric substrate. The dielectric substrate and the dielectric layer may be of plastic material. The dielectric substrate may be of polyester, for example. Paper may be used instead of plastic materials.

The dielectric layer may be of polypropylene, for example. The dielectric layer is preferably made of a foam, i.e. a lightweight cellular material wherein bubbles are formed during manufacturing. Instead of plastic material the dielectric layer may be a dielectric adhesive.

The substrate has a first side and a second side. The substrate comprises an antenna on the first side of the substrate. The substrate may comprise a ground plane on the second side of the substrate. The antenna and the ground plane may be etched or printed to the substrate but on the opposite sides, or they may be etched or printed on their own substrates.

The antenna and the ground plane are configured to overlap. They may overlap in such a manner that the antenna on the first side of the substrate extends at least partially on top of the ground plane on the second side of the substrate, or the antenna on the dielectric substrate extends at least partially on top of the ground plane on its own ground plane substrate. In the ready RFID tag the dielectric substrate is folded over the dielectric layer in such a manner that the ground plane is configured to cover the antenna on the back side of the RFID tag. The ground plane may cover the whole back side of the RFID tag. The ground plane stabilizes the radiation of the antenna.

The substrate may be folded over one edge of the dielectric layer, or it may be folded over two opposite edges of the dielectric layer. The antenna and the ground plane are coupled through a capacitive coupling. Thus, the ground plane can work as a shielding ground and a radiating element together with the antenna. The RFID tags may be printed and encoded simultaneously since near field communication of the antenna by the ground plane from backside of the RFID transponder is enabled.

The RFID tags may be manufactured by a roll-to-roll process. The RFID tags may be adhesively attached to a release liner. They may be printed one after the other when they are on a surface of a web or a sheet.

BRIEF DESCRIPTION OF THE DRAWINGS

In the following the invention will be described in greater detail by means of preferred embodiments with reference to the attached drawings, in which

FIG. 4 shows a cross section of RFID tags of FIG. 2;

FIG. 5 shows a substrate from above.

DETAILED DESCRIPTION OF THE INVENTION

Figure 1:
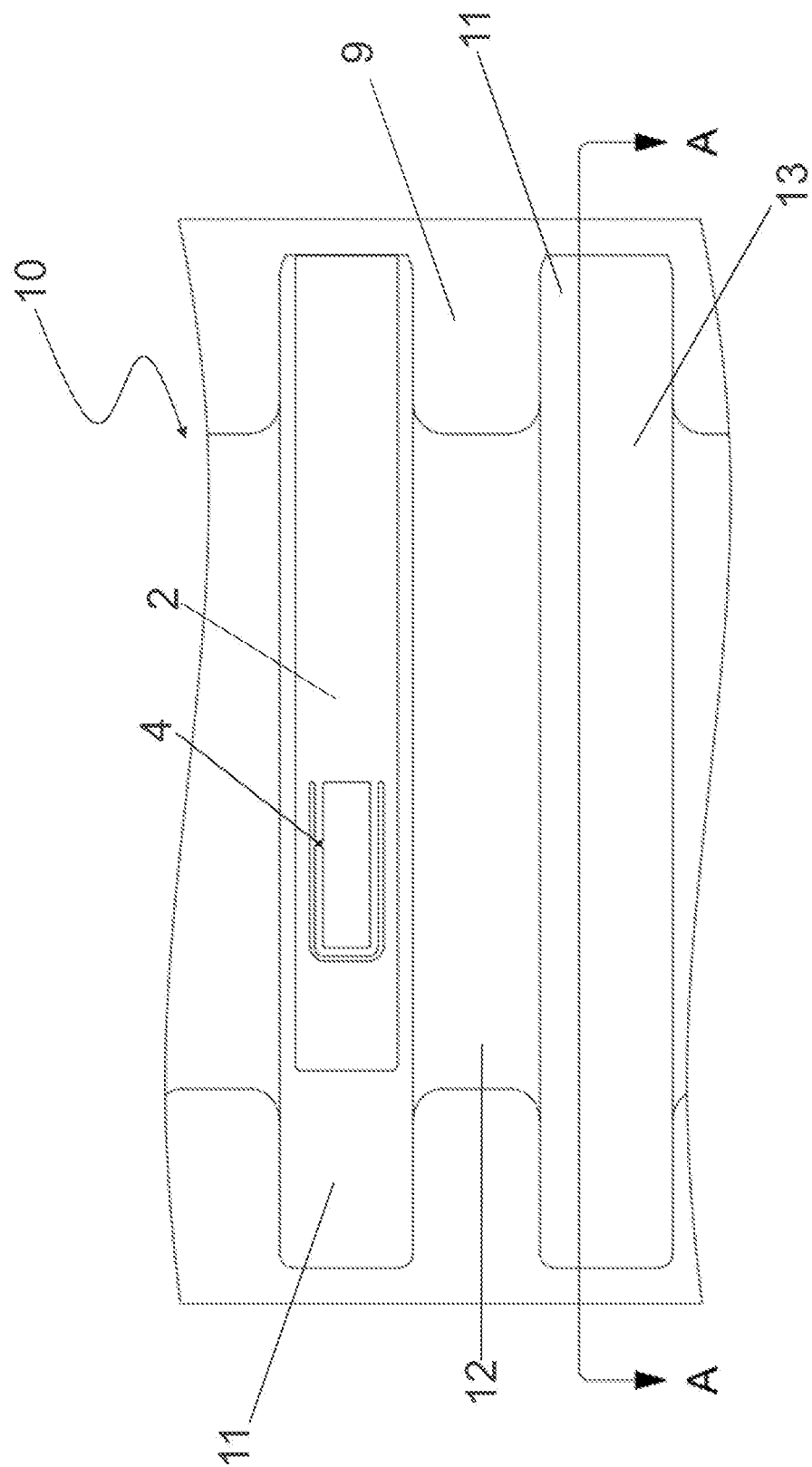
FIG. 1 shows one web comprising successive RFID tags from above.

FIG. 1 shows a web 10 comprising successive RFID tags 11 on a release liner 9. Between successive RFID tags 11 there may be spacers 12 that prevent a printing head of a printer-encoder to fall into a gap between the successive RFID tags 11.

It is shown in one of the RFID tags 11 where in the tag a chip 4 and an antenna 2 are located. The cross-section A-A of FIG. 1 is shown in FIG. 3.

Figure 2:
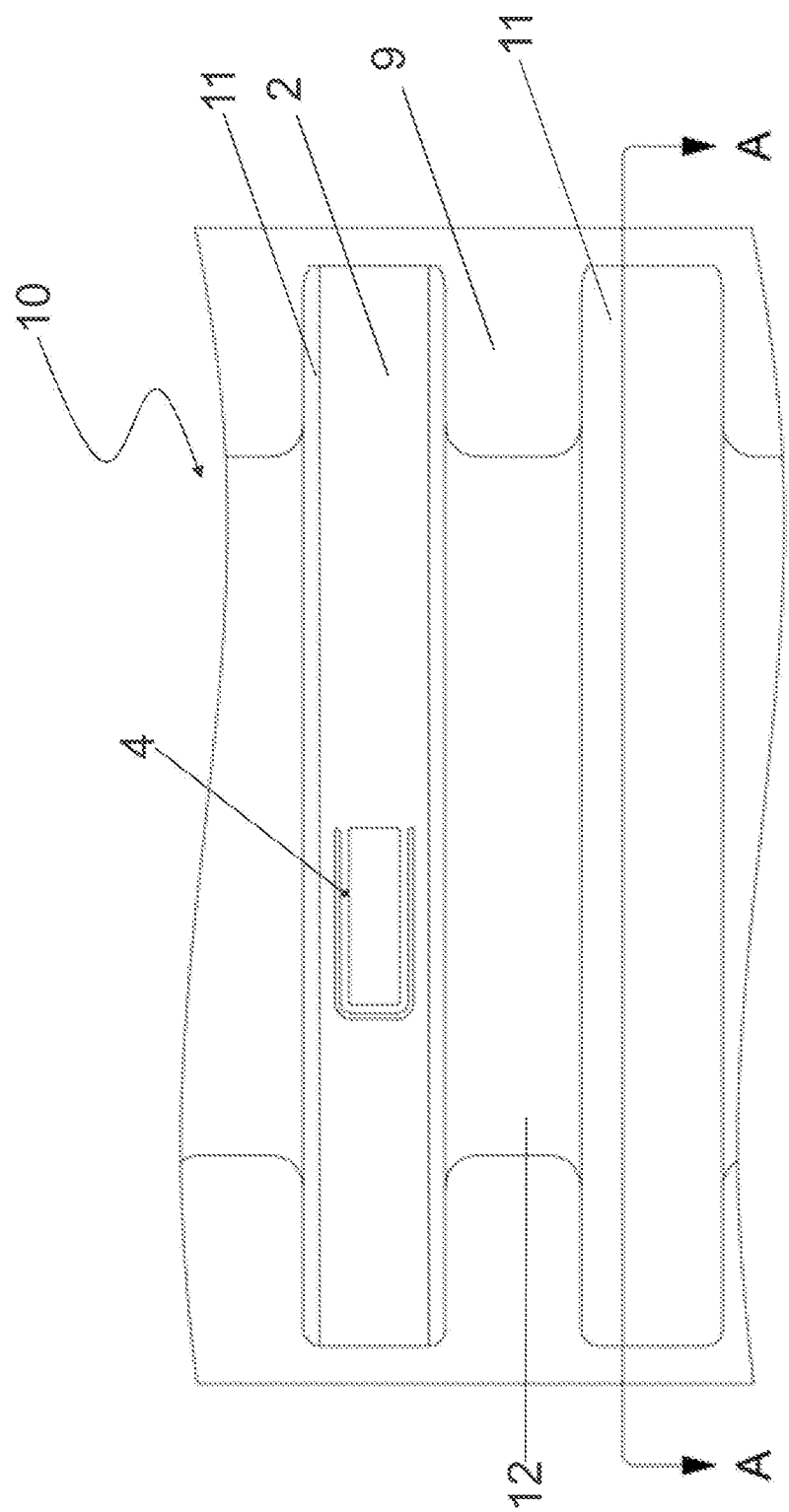
FIG. 2 shows another web comprising successive RFID tags from above.

FIG. 2 shows a web 10 comprising successive RFID tags 11 on a release liner 9. Between successive RFID tags 11 there may be spacers 12 that prevent a printing head of a printer-encoder to fall into a gap between the successive RFID tags 11.

It is shown in one of the RFID tags 11 where in the tag a chip 4 and an antenna 2 are located. The cross-section A-A of FIG. 2 is shown in FIG. 4.

Figure 3A:
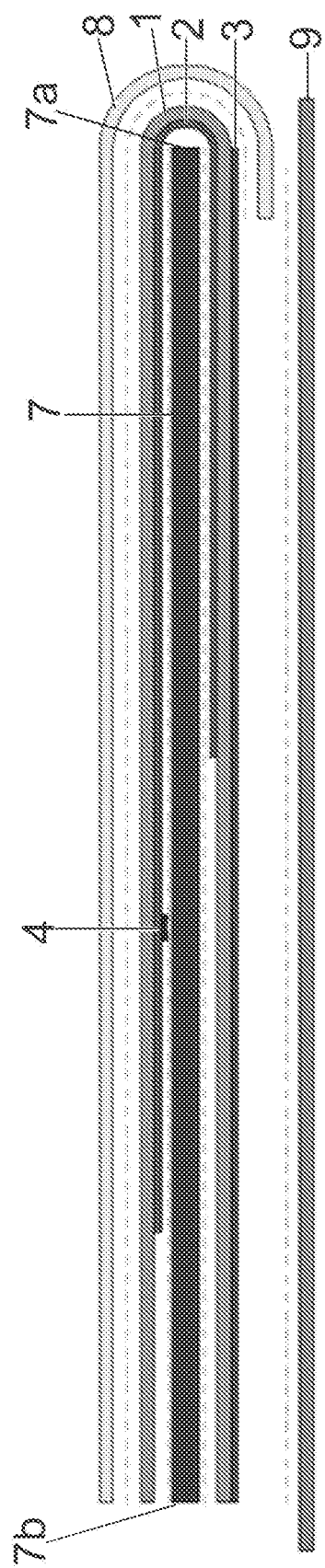
FIG. 3a shows a cross section of RFID tags of FIG. 1.

FIG. 3a shows one possible structure of an RFID tag 11. The RFID tag 11 comprises a substrate 1, a dielectric layer 7 and a face layer 8. The RFID tag 11 may be attached to a release liner 9. The substrate 1, the dielectric layer 7 and the face layer 8 may be attached together by an adhesive. Dashed lines in FIG. 3 denote possible locations where adhesive is used.

The substrate 1 comprises an antenna 2, a ground plane 3 and a chip 4. The chip is electrically connected to the antenna 2. The antenna 2 and the ground plane 3 are on the opposite sides of the substrate 1. The substrate 1 is folded over the edge 7a of the dielectric layer 7 in such a manner that the ground plane 3 is configured to cover the antenna 2 on the back side of the RFID tag.

The face layer 8 may be omitted in some cases. The side of the substrate 1 that faces to the front side of the RFID tag 11 may be a printable surface. In that case the substrate must be selected in such a manner that the prerequisites of the printable surface are fulfilled.

Figure 3B:
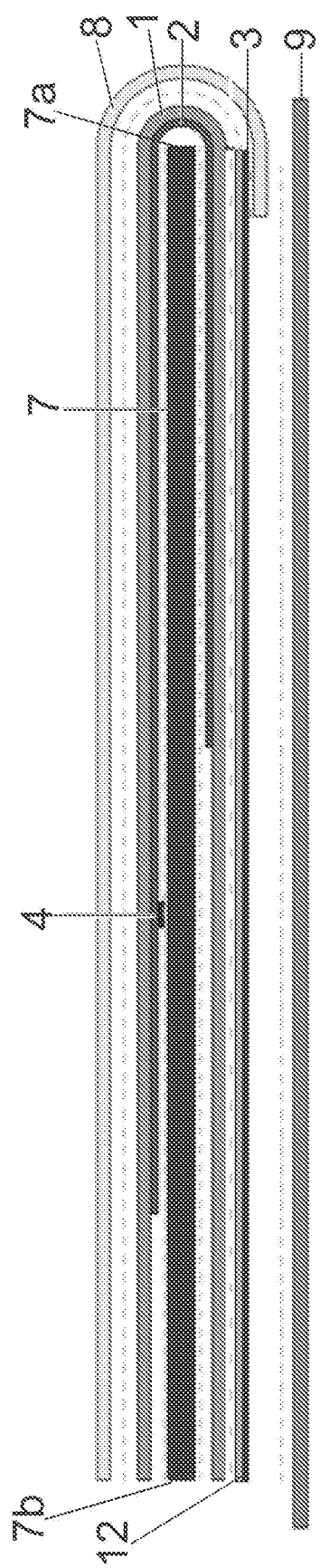
FIG. 3b shows another cross section of RFID tags of FIG. 1.

The ground plane 3 may be on its own ground plane substrate 12 under the dielectric substrate 1 in some cases as shown in FIG. 3b.

Thus, it is possible that there is a tag 11 having an antenna 2 and a ground plane 3 on the same substrate 1, or there is a tag 11 having an antenna 2 and a ground plane 3 on separate substrates 1, 12. Both above-mentioned alternatives are feasible with, or without a face layer 8.

FIG. 4 shows another possible structure of an RFID tag 11. The RFID tag comprises a substrate 1, a dielectric layer 7 and a face layer 8. The RFID tag may be attached to a release liner 9. The substrate 1, the dielectric layer 7 and the face layer 8 may be attached together by an adhesive. Dashed lines in FIG. 4 denote possible locations where adhesive is used.

The substrate 1 comprises an antenna 2, a ground plane 3 and a chip 4. The chip is electrically connected to the antenna 2. The antenna 2 and the ground plane 3 are on the opposite sides of the substrate 1. The substrate 1 is folded over two opposite edges 7a, 7b of the dielectric layer 7 in such a manner that the antenna 2 coils around the dielectric layer 7. The ground plane 3 is configured to cover the antenna 2 on the back side of the RFID tag.

The face layer 8 may be omitted in some cases. The side of the substrate 1 that faces to the front side of the RFID tag 11 may be a printable surface. In that case the substrate must be selected in such a manner that the prerequisites of the printable surface are fulfilled.

The ground plane 3 may be on its own ground plane substrate under the dielectric substrate 1 in some cases.

Thus, it is possible that there is a tag 11 having an antenna 2 and a ground plane 3 on the same substrate 1, or there is a tag 11 having an antenna 2 and a ground plane 3 on separate substrates 1, 12 as shown in FIG. 3b. The same detail can also be applied to the structure of FIG. 4. Both above-mentioned alternatives are feasible with, or without a face layer 8.

FIG. 5 shows an example of the first side of a substrate 1 when the substrate 1 is in a straight form. The substrate comprises an antenna 2 on the first side and a ground plane 3 on the second side (dashed line). The antenna 2 and the ground plane 3 may be formed by etching or printing. The antenna 2 and the ground plane 3 may be of a metallic material, such as aluminium or copper, or they may be of an electrically conductive polymer.

The antenna 2 and the ground plane 3 overlap in a region 6. The region 6 is only schematically shown in FIG. 5 and thus, its length may vary depending on where the substrate 1 is used.

The substrate 1 further comprises an integrated circuit on a chip 4 that is electrically connected to the antenna 2 by conductors. The conductors of the chip 4 may be formed in the same way as the antenna 2 and the ground plane 3. In FIG. 5 the conductors are formed by removing antenna material from spaces 5.

It will be obvious to a person skilled in the art that, as the technology advances, the inventive concept can be implemented in various ways. The invention and its embodiments are not limited to the examples described above but may vary within the scope of the claims.

The invention claimed is:

1. An RFID tag (11) having a front side and a back side, the RFID tag (11) comprising:
    a printable surface on the front side of the RFID tag;
    a dielectric substrate, the dielectric substrate has a first side and a second side opposite to the first side in the thickness direction of the dielectric substrate, the dielectric substrate comprises on the first side of the substrate an antenna and an integrated circuit on a chip electrically connected to the antenna and on the second side of the substrate a ground plane, the antenna on the first side and the ground plane on the second side are configured to overlap; and,
    a dielectric layer;
    wherein the dielectric substrate is folded over at least one edge of the dielectric layer from one side of the dielectric layer to the other side of the dielectric layer in such a manner that the antenna extends over the fold and the ground plane is configured to cover the antenna on the back side of the RFID tag.

2. The RFID tag according to claim 1, wherein the substrate is folded over two opposite edges of the dielectric layer.

3. The RFID tag according to claim 1, wherein the dielectric layer is a foam.

4. The RFID tag according to claim 1, wherein the printable surface is a paper or plastic layer.

5. The RFID tag according to claim 1, wherein the printable surface is the second side of the substrate facing to the front side of the RFID tag.

6. The RFID tag according to claim 5, wherein the second side of the substrate comprises a lacquer or a coating.

7. An RFID tag having a front side and a back side, the RFID tag comprises:
    a printable surface on the front side of the RFID tag;
    a dielectric substrate, the dielectric substrate has a first side and a second side opposite to the first side in the thickness direction of the dielectric substrate, the dielectric substrate comprises on the first side of the substrate an antenna and an integrated circuit on a chip electrically connected to the antenna;

a dielectric layer; and a ground plane on a ground plane substrate on a side of the second side of the dielectric substrate;

wherein the dielectric substrate is folded over at least one edge of the dielectric layer from one side of the dielectric layer to the other side of the dielectric layer in such a manner that the antenna extends over the fold and the antenna on the first side of the substrate and the ground plane are configured to overlap and the ground plane is configured to cover the antenna on the back side of the RFID tag.

8. The RFID tag according to claim 7, wherein the substrate is folded over two opposite edges of the dielectric layer.

9. The RFID tag according to claim 7, wherein the dielectric layer is a foam.

10. The RFID tag according to claim 7, wherein the printable surface is a paper or plastic layer.

11. The RFID tag according to claim 7, wherein the printable surface is the second side of the substrate facing to the front side of the RFID tag.

12. The RFID tag according to claim 11, wherein the second side of the substrate comprises a lacquer or a coating.

13. An RFID tag having a front side and a back side, the RFID tag comprises:

a printable face layer of paper or plastic on the front side of the RFID tag;

a dielectric substrate, the dielectric substrate has a first side and a second side opposite to the first side in the thickness direction of the dielectric substrate, the dielectric substrate comprises on the first side of the substrate an antenna and an integrated circuit on a chip electrically connected to the antenna and on the second side of the substrate a ground plane, the antenna on the first side and the ground plane on the second side are configured to overlap; and a dielectric layer;

wherein the dielectric substrate is folded over at least one edge of the dielectric layer from one side of the dielectric layer to the other side of the dielectric layer in such a manner that the antenna extends over the fold and the ground plane is configured to cover the antenna on the back side of the RFID tag.

14. The RFID tag according to claim 13, wherein the substrate is folded over two opposite edges of the dielectric layer.

15. The RFID tag according to claim 13, wherein the dielectric layer is a foam.

* * * * *